(12) United States Patent
Da Silva et al.

(10) Patent No.: US 11,721,248 B2
(45) Date of Patent: Aug. 8, 2023

(54) TRIM ELEMENT COMPRISING A MAIN DISPLAY SURFACE AND A PERIPHERAL DISPLAY SURFACE

(71) Applicant: Faurecia Clarion Electronics Europe, Paris (FR)

(72) Inventors: Edouard Da Silva, Herblay (FR); Romain Feilleux, Epinary (FR)

(73) Assignee: Faurecia Clarion Electronics Europe, Nanterre (FR)

( * ) Notice: Subject to any disclaimer, the term of this patent is extended or adjusted under 35 U.S.C. 154(b) by 0 days.

(21) Appl. No.: 17/736,973

(22) Filed: May 4, 2022

(65) Prior Publication Data

US 2022/0358858 A1 Nov. 10, 2022

(30) Foreign Application Priority Data

May 4, 2021 (FR) .............................. FR 21 04686

(51) Int. Cl.
*G09F 13/18* (2006.01)
*G09F 13/04* (2006.01)
*G09F 13/22* (2006.01)

(52) U.S. Cl.
CPC .......... *G09F 13/18* (2013.01); *G09F 13/0413* (2013.01); *G09F 13/22* (2013.01); *G09F 2013/1881* (2013.01); *G09F 2013/222* (2013.01); *G09F 2013/227* (2013.01)

(58) Field of Classification Search
CPC ...... G09F 13/18; G09F 13/0413; G09F 13/22; G09F 2013/1881; G09F 2013/222; G09F 2013/227
See application file for complete search history.

(56) References Cited

U.S. PATENT DOCUMENTS

| 10,688,922 B2* | 6/2020 | Cho ....................... G02B 6/006 |
| 10,696,161 B2 | 6/2020 | Hélot et al. |
| 10,821,889 B2* | 11/2020 | DeGrote .................. B60Q 3/64 |
| 2007/0047215 A1* | 3/2007 | Egami ..................... G09F 19/12 362/23.15 |

(Continued)

FOREIGN PATENT DOCUMENTS

| DE | 112018006230 T5 | 9/2020 |
| DE | 102019206921 A1 | 11/2020 |

(Continued)

OTHER PUBLICATIONS

French Search Report corresponding to French Application No. FR 2104686, dated Nov. 26, 2021, 2 pages.

*Primary Examiner* — Gary C Hoge
(74) *Attorney, Agent, or Firm* — Reising Ethington P.C.

(57) ABSTRACT

A trim element having an outer surface that is at least partially translucent, the outer surface defining a main display surface and a peripheral display surface, the peripheral display surface extending around at least a portion of the main display surface, a screen of a display device extending opposite the main display surface. The trim member includes an illumination device having a luminous sheet extending opposite the main display surface and the peripheral display surface so as to emit at least a first luminous signal onto the screen and at least a second luminous signal illuminating at least a portion of the peripheral display surface when the luminous sheet is activated.

10 Claims, 3 Drawing Sheets

(56) References Cited

U.S. PATENT DOCUMENTS

| | | | |
|---|---|---|---|
| 2011/0157906 A1* | 6/2011 | Oeuvrard | B60R 13/02 |
| | | | 362/488 |
| 2012/0051067 A1* | 3/2012 | Murray | G09F 13/22 |
| | | | 29/592.1 |
| 2014/0085258 A1* | 3/2014 | Beraud | G06F 3/044 |
| | | | 345/174 |
| 2016/0059701 A1 | 3/2016 | Isobe et al. | |
| 2019/0232887 A1* | 8/2019 | Benchikhi | B60K 35/00 |
| 2021/0271016 A1 | 9/2021 | Arihara et al. | |

FOREIGN PATENT DOCUMENTS

| | | |
|---|---|---|
| DE | 202021100684 U1 | 3/2021 |
| EP | 2214151 A1 | 8/2010 |
| FR | 3091505 A1 | 7/2020 |

* cited by examiner

TRIM ELEMENT COMPRISING A MAIN DISPLAY SURFACE AND A PERIPHERAL DISPLAY SURFACE

This application claims the benefit of French Patent Application No. FR 21 04686 filed on May 4, 2021, which is hereby incorporated by reference.

TECHNICAL FIELD

The present invention relates to a trim element of the type comprising an at least partially translucent outer surface, the outer surface defining a main display surface and a peripheral display surface, the peripheral display surface extending around at least a portion of the main display surface, a screen of a display device extending opposite the main display surface.

The trim element according to the invention is a display module, for example, comprising a display device or a decorative piece comprising a display device. The invention applies to a vehicle trim element, for example.

BACKGROUND

It is known to integrate a display device into a trim element, such as a dashboard, a center console, a seat, a door panel or the like, so as to display information and/or audiovisual content for vehicle passengers.

To do so, the housing of the display device extends into the body of the trim element and the display surface, for example, formed on a transparent glass or lens and on which the images of the display device are displayed, extending, for example, substantially in continuity with the outer surface of the body, for example, formed on an upholstery layer or an edge piece, so that the trim element has a substantially continuous and uninterrupted outer surface that has a satisfactory appearance.

However, in order to display content with sufficient dimensions to be comfortably visible to vehicle passengers, the display surface and the housing of the display device must have large dimensions, which increases the footprint of the display in the trim element, potentially at the expense of other functional elements, and increases the cost of the trim element that integrates the display.

To overcome this drawback, it may be possible to reduce the size of the display surface, but this is done at the expense of the display quality and/or the amount of information displayed on the display surface.

One object of the invention is to overcome these disadvantages by providing a trim element comprising an integrated display device with reduced space requirements and cost and with a particularly favorable appearance and display quality.

SUMMARY

To this end, the invention relates to a trim element of the aforesaid type, comprising an illumination device, the illumination device comprising at least one luminous sheet arranged to emit light towards the outer surface, said luminous sheet extending facing the main display surface and the peripheral display surface so as to emit at least a first luminous signal onto the screen and at least a second luminous signal illuminating at least a portion of the peripheral display surface when the luminous sheet is activated.

By providing a luminous sheet extending away from the main display surface, it is possible to use the light generated by the luminous sheet to display additional information on the outer surface of the trim member outside of the content displayed through the screen. In this way, it is possible to reduce the size of the screen, and thus reduce the costs of the trim element, while maintaining a satisfactory display quality. In other words, the luminous sheet makes it possible to increase the display area on the outer surface of the trim element artificially and thus to have a content having satisfactory dimensions for the passengers of the vehicle while reducing the screen size. In addition, the light emitted by the luminous sheet can be arranged to make the transition between the main display surface and the peripheral display surface substantially invisible to the naked eye.

Furthermore, by providing an outer surface defining a main display surface and a peripheral display surface, the trim element has a continuous outer surface that makes it possible to have a natural and seamless transition between the main display surface and the peripheral display surface, and thus improves the perceived quality. The trim element may further comprise one or more of the following features, considered alone or in any technically feasible combination:

- the first luminous signal and the second luminous signal are arranged to emit light that renders the transition between the main display surface and the peripheral display surface substantially invisible to the naked eye from outside of the trim element when the luminous sheet is activated;
- the display surface comprises at least one signaling area forming a pictogram and/or designating an area that can be activated by contact with said activatable area;
- the main display surface is formed by a transparent element comprising an outer surface forming the main display surface and an inner surface, opposite the outer surface and facing the screen, the peripheral display surface being formed by at least a portion of an outer surface of an edge piece surrounding at least a portion of the transparent element, with at least one portion of said edge piece being translucent;
- the outer surface of the transparent element extends substantially in the same plane as at least a portion of the outer surface of the edge piece, such that the outer surface of the trim element is substantially continuous and uninterrupted at the transition between the main display surface and the peripheral display surface;
- the screen is held by a support comprising at least a portion extending facing the peripheral display area, the luminous sheet extending on the reverse of said screen and said portion of the support so that the light emitted by said luminous sheet passes through the screen and the portion of the support before reaching the outer surface of the trim element;
- the illumination device comprises at least one light guide extending from the luminous sheet and directing the light emitted by said luminous sheet onto at least a portion of the peripheral display surface;
- the luminous sheet comprises a plurality of light emitting diodes, forming a matrix of light emitting diodes, defining several sub-matrices of diodes, each sub-matrix being activatable independently of the other sub-matrices; at least one of said sub-matrices generating the first luminous signal and at least one of the other sub-matrices generating the second luminous signal;
- the luminous sheet is flexible and deformable so as to be able to conform to the shape of the trim element;

the display device and the illumination device are driven by the same control unit; said control unit extending on the reverse side of the luminous sheet.

BRIEF DESCRIPTION OF THE DRAWINGS

Further aspects and advantages of the invention will become apparent from the following description, given by way of example and made with reference to the appended drawings, in which.

DETAILED DESCRIPTION OF EMBODIMENTS

Figure 1:
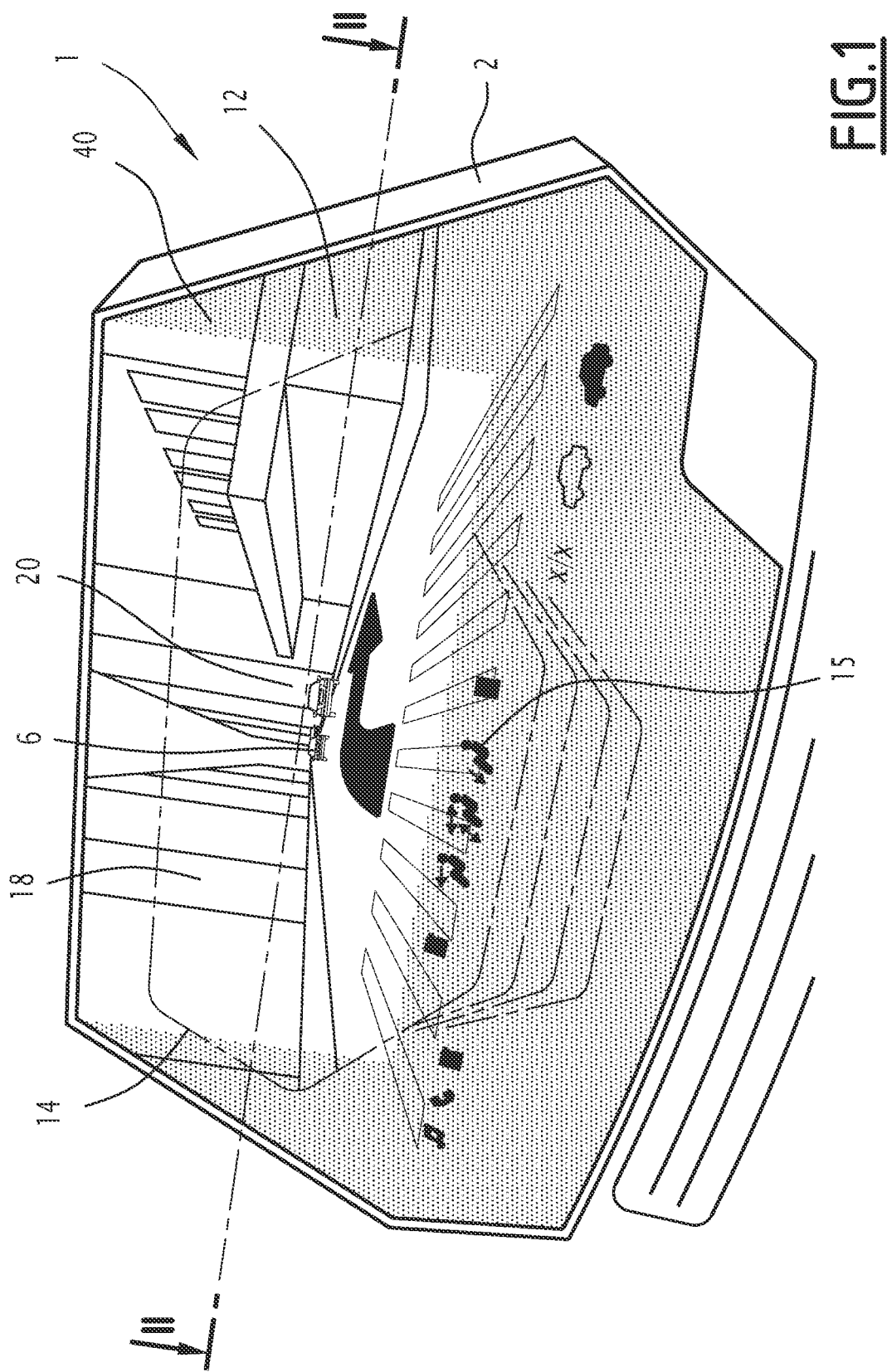
FIG. 1 is a schematic perspective representation of a trim element according to an embodiment of the invention, showing the outer surface of the trim element.
Figure 2:
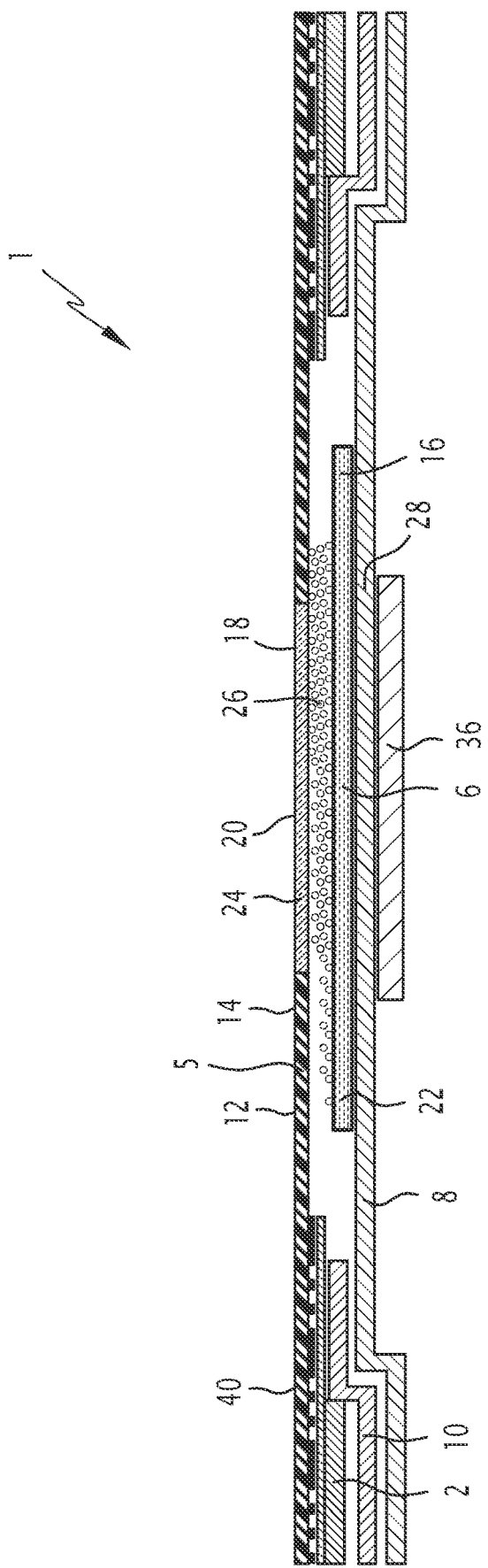
FIG. 2 is a schematic cross-sectional representation of the trim element along axis II-II of FIG. 1.

With reference to FIGS. 1 and 2, a vehicle trim element 1 is described, comprising mainly a body 2, an outer surface 40, a display device 6 and an illumination device 8. Such a trim element 1 forms an instrument panel, a center console, a seat, a door panel or the like, installed in the vehicle interior, for example. In a variant, the trim element 1 forms a display module that can be integrated on another trim element such as a dashboard, etc. Such a display module forms a finished product, for example, which can be used as a stand-alone unit, for example, to be arranged in a vehicle or the room of a building or used nomadically. Thus, as shown in FIG. 1, the display module can be installed on a dashboard.

The body 2 defines the shape of the trim element and gives it its mechanical characteristics beyond the display device. The body 2 may be made of any suitable material, such as a rigid plastic material, foam or the like. The body 2 comprises at least one opening for accommodating the display device 6. Around the opening, the body 2 forms a support 10 for holding a portion of the display device 6, as will be described later. According to one embodiment, the support 10 is formed by a frame extending into the body 2, particularly when the body 2 is made of foam.

The support 10 of the body 2 extends at least partially to the edge of the opening made in the body, or partially in this opening, so as to be able to accommodate the display device 6 that extends into the opening.

The outer surface 40 forms the visible portion of the trim element 1 from the vehicle interior.

According to one embodiment, the outer surface 40 is formed by the outer surface of a single outer piece extending over the body 2 and covering the opening formed therein. Such an outer piece may be substantially planar and formed of a rigid translucent material, such as a plastic material or glass. In one variant, the outer piece may be formed by a translucent skin. The outer portion may also be non-planar and conform to the shape of the body 2, for example. Thus, the outer piece defines the appearance of the trim element 1.

According to another embodiment shown, the outer surface 40 is formed partially by an outer surface of an edge piece 5, and another portion extending facing at least a portion of the opening of the body 2 is formed by a portion of the display device 6, as will be described later.

The edge piece 5 also comprises an opening extending facing at least a portion of the opening of the body 2, for the passage of a portion of the display device 6, as will be described later. The edge piece 5 has an outer surface 12, opposite the inner surface of the edge piece 5 that is applied to the body, forming part of the outer surface 40 of the trim element 1. Thus, the edge piece 5 defines the appearance of at least a portion of the trim element 1, and the edge piece 5 may be made of any material suitable to provide a satisfactory appearance to the trim element 1. According to one embodiment, the edge piece 5 may be made in one piece with the body 2 of the trim element 1.

The edge(s) of the opening of the edge piece 5 is referred to as the peripheral area of the edge piece 5. In other words, the peripheral area of the edge piece 5 corresponds to the portion of the edge piece 5 that surrounds at least a portion of a display device 6, as will be described in more detail later. At least the peripheral area of the edge piece 5 is translucent, that is, it lets light coming from the side of the body 2 to the outer surface 12 of the peripheral area. Translucent means a light transmission rate substantially between 5% and 100%, with a light transmission rate of less than 5% corresponding to an opaque part not letting light to pass through. Thus, at least the peripheral area of the edge piece 5 lets light coming from the interior of the trim element 1 pass through, so that this light is visible on the outer surface 12 of the peripheral area. According to one embodiment, the entire edge piece 5 is translucent and the edge piece areas that are to not let light to pass through are then installed on an opaque part, formed by the body 2, for example. According to one embodiment, the edge piece 5 is formed by a skin of translucent synthetic material. The peripheral area forms a peripheral display surface 14, as will be described later.

According to one embodiment, the peripheral area may comprise opaque areas, by providing a mask extending over the inner surface of the peripheral area, for example, in order to define one or more patterns letting light pass through, to form pictograms or the like, for example. As shown in FIG. 1, such patterns are used to form at least one signaling area 15, linked to one or more functions of the vehicle or of a device connected to the vehicle, on the outer surface 12 of the peripheral area, as will be described in more detail later.

Figure 3:
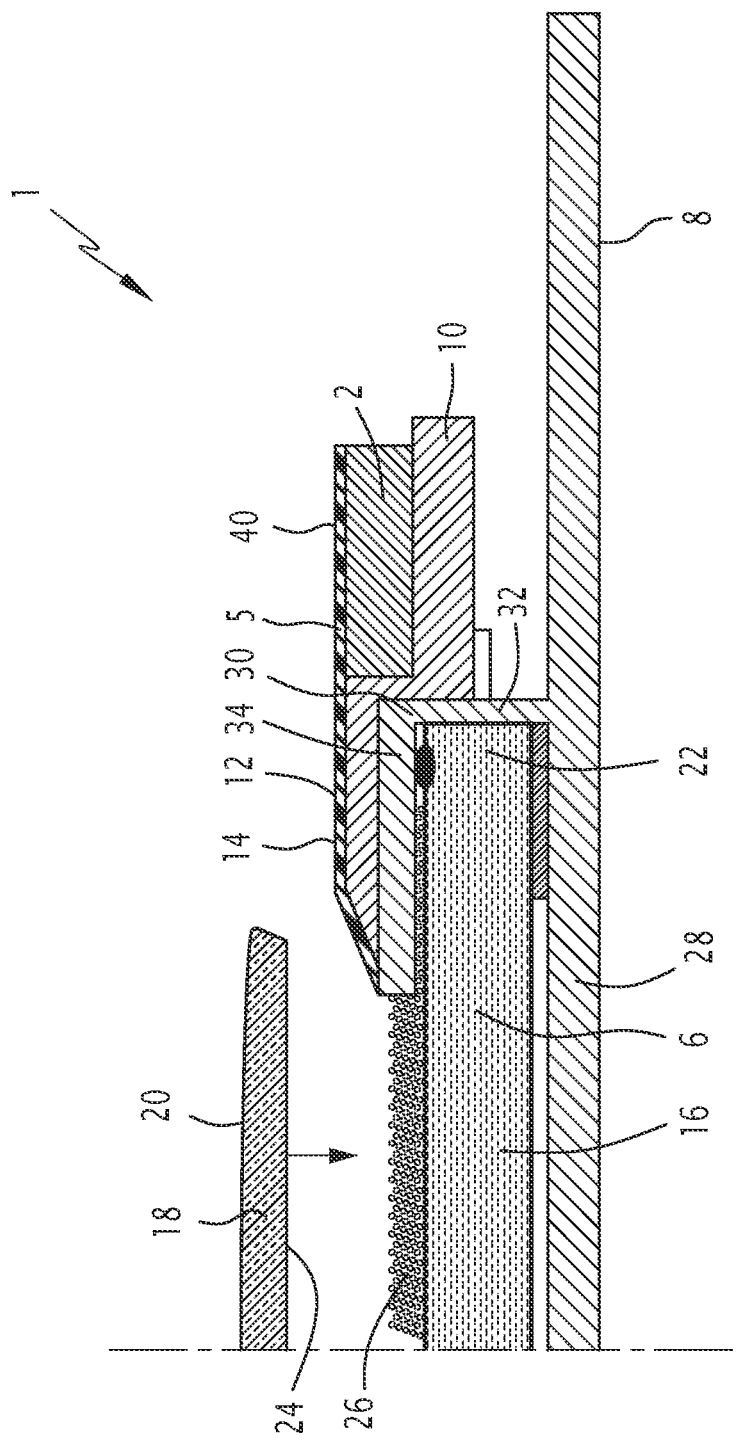
FIG. 3 is a schematic cross-sectional representation of a detail of a trim element according to one embodiment of the invention.

The display device 6 comprises at least one screen 16 and, according to the embodiment shown in FIGS. 2 and 3, the screen 16 extends facing a transparent element 18 forming a main display area 20.

The screen 16 is formed by a liquid crystal panel, for example, arranged to form images when the panel is illuminated and driven, as will be described later. The screen 16 thus lets light pass, in particular from a face turned towards the interior of the trim element to a face turned towards the exterior of the trim element. According to one embodiment more particularly visible in FIG. 3, the screen 16 comprises an opaque border 22 forming a technical part of the screen 16 that ensures the connectivity of the screen 16, for example. This opaque border 22 does not let light pass through like the rest of the screen 16. It should be noted that the screen 16 here refers only to the liquid crystal panel and not to the panel's illumination device, as may usually be the case. According to one embodiment, the screen 16 is a touch screen with which a user can interact by contact with the main display surface 20. To do so, a capacitive film (not shown) is applied on or in the vicinity of the screen 16, such as between the screen 16 and the transparent element 18, for example, in a manner known per se.

The screen 16 extends into the opening made in the body 2, facing the opening in the edge piece 5, and is mounted on the support 10 of the body 2 that holds the screen 16 in the body 2, for example.

The screen 16 is arranged to display images on a main display surface 20 when illuminated by the illumination device 8.

According to the embodiment in which the outer surface 40 is formed by a single outer layer, the main display surface 20 is formed by the portion of the outer layer that extends facing the screen 6. In this case, the peripheral display surface 14 is formed by a portion of the outer layer that extends around at least a portion of the main display surface 20. According to one embodiment, the peripheral display surface 14 extends all around the main display surface 20.

According to the embodiment shown in FIGS. 2 and 3, the main display surface 20 is formed by a transparent element 18, as described above, the transparent element 18 extending into the opening made in the edge piece 5.

The transparent element 18 is formed by a pane or a lens, for example, made of plastic material, glass or the like. According to one embodiment, the transparent element 18 is made of a different material than the edge piece 5. As shown in FIGS. 2 and 3, the transparent element 18 extends into the opening of the edge piece 5 turned towards the screen 16 and is arranged for the images generated by the screen 16 to be displayed crisply on the main display surface 20. To this end, the transparent element 18 comprises an inner surface 24 turned towards the screen 16 and an outer surface, opposite the inner surface 24 and turned towards the outside of the trim element 1 and forming the main display surface 20. The light passing through the screen 16 is thus transmitted towards the inner surface 24 of the transparent element 18 and from the inner surface 24 to the outer surface 25 on which the images emitted by the screen 16 are displayed. To ensure good light transmission between the screen 16 and the transparent element 18, an optical transmission material 26 such as an optical adhesive may be provided between the side of the screen 16 turned towards the transparent element 18 and the inner surface 24 of the transparent element 18, as shown in FIG. 2. Such an optical adhesive further ensures a bond between the screen 16 and the transparent element 18. For a touch screen 16, it will be noted that the capacitive film may also extend over the inner surface 24 of the transparent element 18. It will be noted that such a capacitive film may also be provided to form one or more touch surfaces on the outer surface 12 of the peripheral area of the edge piece 5, for example, facing one or more signaling areas 15. In one variant, different capacitive films are provided to make the main display surface 20 tactile and to make the peripheral display surface 14 tactile.

According to one advantageous embodiment, the main display surface 20 extends substantially in the same plane as the peripheral display surface of the edge piece 5 so that the outer surface 40 of the trim element 1, formed at least partially by the outer surface 12 of the edge piece 5 and by the main display surface 20 so that it is substantially continuous. More particularly, the transparent element 18 and opening of the edge piece 5 are fitted to each other, for example, such that the outer surface of the trim element is substantially uninterrupted at the transition between the outer surface 12 of the peripheral area 14 and the main display surface 20. In other words, the edge opening(s) of the edge piece abut the edge(s) of the transparent element 18. Again in other words, the opening of the edge piece 5 has a shape substantially complementary to that of the transparent element 18. It should be noted that the transparent element 18 may have any suitable shape, corresponding to the shape of the screen 16, for example. Thus, the transparent element 18 may be substantially rectangular, rectangular with rounded corners, oblong, circular or the like. It will also be noted that the invention is not limited to a flat outer surface of the trim element. Thus, the main display surface 20 may be slightly domed or curved, for example. In this case, "the main display surface 20 extends substantially in the same plane as the peripheral area of the edge piece" means that the peripheral area follows substantially the same curvature as the main display surface 20 so that the outer surface of the trim element 1 has a continuity at the transition between the peripheral area and the main display surface 20. Thus, according to one example, the peripheral area has a radius of curvature substantially equal to that of the main display surface 20, for example.

In the case where the outer surface is formed by a single outer layer, it is understood that continuity between the main display surface 20 extending facing the screen 16 and the remainder of the outer surface 40 is achieved by simply providing a substantially continuous outer layer.

By having a substantially continuous and uninterrupted outer surface 40, the trim element is given a particularly satisfactory appearance, enhancing the impression of integration of the display device 6 into the trim element 1. In order to further enhance this impression, dying the transparent element 18 may be considered, or adding a colored film on the main display surface 20, so that the transparent element 18 has the same appearance as the edge piece 5, especially when the display device is off and not illuminated by the illumination device 8, as will be described later. Thus, in the case of a black edge piece 5, the transparent element 18 may be smoked, for example, so that, when viewed from the outside, the presence of the display device 6 is hardly or not at all visible in relation to the rest of the trim element 1 when the illumination device 8 is not activated. If a colored film is applied to the outer surface of the transparent element 18, then the outer face of this film forms the main display surface 20 and extends in continuity with the outer surface 12 of the peripheral area.

According to one embodiment, one or more areas of the transparent element 18 (or of the external layer according to the corresponding embodiment) may be textured to form one or more signaling areas in addition to the signaling areas 15 provided in the peripheral area 14, for example. The transparent element 18 may be subjected to laser radiation, for example, to create micro-texturing in one or more areas of the inner surface 24 and/or the outer surface of the transparent element 18 and thereby create one or more patterns, defining pictograms on the display surface, for example, which appear when the display surface is illuminated. The laser radiation is used to modify the tribological characteristics of the transparent element 18 to create areas of passive haptic feedback on the main display surface 20, with the transition between these areas and the remainder of the main display surface 20 being substantially invisible to the naked eye from outside of the trim element 1.

According to one embodiment, the screen 16 has larger dimensions than the transparent element 18 such that a portion of the screen 16, in particular one or more edges, extends facing a portion of the peripheral area of the edge piece. According to this embodiment, the images generated by this portion of the screen 16 are thus displayed on the on the peripheral display surface 14 of a portion of the peripheral area, as will be described in more detail later.

The illumination device 8 is arranged to illuminate the display device 6 and the peripheral display surface 14 when activated. In other words, the illumination device 8 does not only illuminate the display device 6, as is usually the case, but also illuminates an area extending around the display device 6. To this end, the illumination device 8 comprises a luminous sheet 28 extending facing the display device 6 and the peripheral display surface 14 and arranged to emit a first luminous signal towards the main display surface 20 and a second luminous signal towards the peripheral display surface 14. In other words, the same luminous sheet extends at least opposite the main display surface 20 and the peripheral display surface 14. More particularly, the luminous sheet 28 extends on the side of the inner face of the screen 16 and closes the opening of the body 2 opposite the outer surface 40, as shown in FIGS. 2 and 3. In other words, the luminous sheet 28 extends on the reverse of the screen 16 and the portion of the support 10 extending facing the peripheral display surface 14, so that the light emitted by the luminous sheet 28 passes through the screen 16 and this portion of the support 10 before reaching the outer surface 40 of the trim element, the same luminous sheet 28 illuminating both the main display surface 20 and the peripheral display surface 14.

Thus, according to the embodiment shown in FIGS. 2 and 3, the first luminous signal emitted by the luminous sheet 28 passes through the entire screen 16 and the second luminous signal reaches the peripheral display surface 14. According to the embodiment shown in FIGS. 2 and 3, the second luminous signal passes more particularly through the peripheral area of the edge piece 5, for example, by passing through the screen 16, for the portion that extends facing the peripheral area, and through the support 10, which is then arranged to let light to pass through to illuminate a portion of the peripheral area that does not extend facing the screen 16, for displaying other images thereon, as will be described later, and/or to create ambient illumination giving the impression of an enlarged display surface beyond the main display surface 20 of the transparent element itself.

More particularly, the luminous sheet 28 may be used to make the transition between the main display surface and the outer surface 12 of the peripheral area 14 substantially invisible to the naked eye from outside of the trim element when the luminous sheet is activated, by continuously illuminating the display surface 20 and the peripheral area 14 and selecting a first luminous signal and a second luminous signal suitable for this purpose.

Such illumination of the outer surface 40 of the trim element 1 is particularly advantageous in that it gives the impression of a large display surface while the display device 6 can have a small footprint, thereby reducing production costs of the trim element and releasing space for other functions, as will be described later. In addition, by making the transition between the peripheral display surface 14 and the main display surface 20 substantially invisible, the impression of integration of the display device 6 into the trim element is improved, giving the trim element a particularly satisfactory appearance.

According to one embodiment, the illumination device 8 comprises at least one light guide 30, extending from the luminous sheet 28 and bringing the light emitted by said luminous sheet 28 onto at least a portion of the peripheral area 14 of the edge piece. This light guide 30 is useful in the case where the screen 16 comprises an opaque border 22, for example, preventing the light emitted by the luminous sheet 28 from passing through the screen 16 in this border. The light guide 30 then brings the light emitted by this sheet 28 facing the opaque border 22 between the screen 16 and the peripheral display surface 14 of the edge piece 5, as shown in FIG. 3. In a variant or additionally, the light guide 30 may also bring the light facing a portion of the main display surface 20. The light guide 30 is made of a transparent material, for example. The light guide 30 comprises a first leg 32, extending from the luminous sheet 28 along an edge of the screen 16 from the inner side to the outer side thereof, and a second leg 34, extending from the end of the first leg 32 opposite the luminous sheet 28 on the opaque edge 22 of the screen 16, for example. The second leg 34 is arranged to emit the light it receives toward the outer surface of the trim element 1. Thus, the presence of an opaque border 22 does not interrupt the illumination continuity of the outer surface of the trim element 1.

The luminous sheet 28 is formed by a sheet of light-emitting diodes, for example. Thus, the luminous sheet 28 comprises a plurality of light emitting diodes (not shown) forming a diode matrix. The diode matrix defines a plurality of diode sub-matrices that can be activated independently of each other and/or that can each emit a luminous signal that is the same as and/or different from the luminous signals emitted by the other sub-matrices. In other words, the luminous sheet 28 can be made to emit different luminous signal types in different areas thereof. Different luminous signals means different colors and/or different light intensities, for example. More particularly, at least one of the sub-matrices is arranged to emit the first luminous signal and at least one other sub-matrix is arranged to emit the second luminous signal. Thus, the light illuminating the main display surface 20 is not necessarily the same as the light illuminating the peripheral display surface 14, and these lights can be modulated, in particular to make the transition between the main display surface 20 and the peripheral display surface 14 substantially invisible to the naked eye from the outside of the trim element 1, or to create lighting effects such as animations on the outer surface 40 of the trim element 1. Thus, by way of example, the light illuminating the transition between the main display surface 20 and the peripheral display surface 14 and the light illuminating the remainder of the peripheral display surface 14 may be arranged to create a fading effect on the outer surface 40 of the trim element, so as to create a smooth transition between the illuminated portion of the outer surface 40 of the trim element and the non-illuminated portion of the outer surface 40.

According to one embodiment, the luminous sheet 28 is controlled so that a first area of the luminous sheet 28, extending substantially facing the main display surface 20, emits a first luminous signal and a second area of the luminous sheet 28, extending facing the peripheral display surface 14, emits a second luminous signal different from the first luminous signal. The second luminous signal has a first brightness, for example, which is low or zero, in a resting state of the second light area, and a second brightness, which is higher than the first brightness, when the second area is put to be in an activated state. The resting state is used to mask what extends below the peripheral display surface 14 from the exterior of the trim element, despite the translucency of the peripheral display surface 14, while the activated state is used to illuminate the peripheral area 14 as described above, to extend the display area 20, for example.

In addition, the light emitted by certain sub-arrays of diodes is used to illuminate the signaling area(s) 15 provided in the peripheral display surface 14 and/or the main display surface 20, to signal that a function of the vehicle has been activated or is activatable, for example, by touch contact with the illuminated signaling area 15 for example. Thus, the illumination of a signaling area 15 signals to a user that a function can be activated, deactivated, and/or controlled by tactile contact with that signaling area, for example. The functions concerned are functions related to the vehicle, the display device 6 and/or a device connected to the vehicle, for example, such as a cell phone or the like. Similarly, it may be possible to modify the lighting of the signaling area 15, by modifying the color of the light illuminating this area, for example, in order to indicate a change of state of the function. According to one embodiment, the signaling area or areas 15 are substantially invisible to the naked eye from outside of the trim element when the function associated with that area is not activatable and/or is not activated, by illuminating those signaling areas 15 with light identical to the light illuminating the rest of the outer surface, for example. Thus, the information displayed on the outer surface of the trim element is scalable and the pictograms or icons appear only when relevant by being illuminated in a particular way by the luminous sheet 28. Thus, by way of example, the capacitive film extending over the edge piece 5 defines at least one touch button on the peripheral display surface 14 and this touch button is only operable when the peripheral display surface 14 is illuminated by the luminous sheet 28. When part of the images generated by the screen 16 is displayed on the peripheral display surface 14, as previously described, these images may be of the same type as those displayed on the main display surface 20 so as to create an enlarged display surface and/or may be of a different type, to form icons or pictograms on the peripheral area to create additional signaling areas, for example.

The luminous sheet 28 is flexible and deformable, for example, so that its shape can be adapted to its environment in the trim element, as more particularly visible in FIG. 2. Indeed, such a luminous sheet 28, formed by an array of diodes, for example, can be particularly thin (its thickness is substantially in the range of 1 mm to 5 mm, for example, preferably in the range of 2 mm to 3 mm), making it space-saving, flexible and able to adopt the desired shape. Thus, the luminous sheet 28 can follow the shape of the back of the screen 16 and the portion of the support 10 against which it is applied and thus ensure good light transmission in these elements.

As described above, the same luminous sheet 28 illuminates the main display surface 20 and the peripheral display surface 14, but it is understood that the trim element 1 may include other luminous sheets or other lighting elements, to illuminate areas outside the main display surface 20 and the peripheral display surface 14, for example.

The luminous sheet 28 is controlled by a single control unit 36. In other words, the same control unit 36 manages the lighting of the main display surface 20 and that of the peripheral display surface. Advantageously, operating the display device 6 and illumination device 8 can be performed by the same control unit 36, formed by a single printed circuit board, for example, extending on the reverse side of the luminous sheet 28, as shown in FIG. 2, for example. The use of a single control unit 36 further reduces the space requirement of the display device 6 and the illumination device 8 in the trim element and thus frees up space for the integration of other functionalities in the trim element, such as heating areas, operating buttons or the like.

The above-described trim element allows for the integration of a display device 6 with the rest of the trim element in a harmonious, space-saving and economical manner by illuminating a peripheral display surface 14 extending around the main display surface 20 with the same luminous sheet 28 used to illuminate the screen 16 of the display device 6. Thus, the dimensions of the display device 6 can be reduced while maintaining a satisfactory display area extending over both the main display surface 20 and the peripheral display surface 14 extending around the display surface 20.

In one variant, for all of the above-described embodiments, the illumination device comprises at least two luminous sheets arranged to emit light to the outer surface. In particular, according to one particular embodiment, the illumination device comprises a first luminous sheet and a second luminous sheet. For example, the first luminous sheet extends facing the main display surface so as to emit a first luminous signal onto the screen and the second luminous sheet extends facing the peripheral display surface so as to emit a second luminous signal illuminating at least a portion of the peripheral display surface when the luminous sheets are activated. The first luminous sheet and the second luminous sheet are controlled by the control unit 36.

It is understood that the illumination device may comprise any number of luminous sheets. For example, the illumination device may comprise at least two luminous sheets extending facing the main display surface so as to emit a first luminous signal onto the screen, and at least two luminous sheets extending facing the peripheral display surface so as to emit a second luminous signal illuminating at least a portion of the peripheral display surface.

The invention claimed is:

1. A trim element comprising an outer surface that is at least partially translucent, the outer surface defining a main display surface and a peripheral display surface, the peripheral display surface extending around at least a portion of the main display surface, a screen of a display device facing the main display surface, wherein the trim element further comprises an illumination device comprising at least one luminous sheet arranged to emit light towards the outer surface, said luminous sheet extending facing the main display surface and the peripheral display surface so as to emit at least a first luminous signal onto the screen and at least a second luminous signal illuminating at least a portion of the peripheral display surface when the luminous sheet is activated.

2. The trim element according to claim 1, wherein the first luminous signal and the second luminous signal are arranged to emit light rendering the transition between the main display surface and the peripheral display surface invisible to the naked eye from outside of the trim element when the luminous sheet is activated.

3. The trim element according to claim 1, wherein the peripheral display surface comprises at least one signaling area forming a pictogram and/or designating an activatable area by contact with said activatable area.

4. The trim element according to claim 1, wherein the main display surface is formed by a transparent element comprising an outer surface forming the main display surface and an inner surface opposite the outer surface and facing the screen, the peripheral display surface being formed by at least a portion of an outer surface of an edge piece surrounding at least a portion of the transparent element, at least a portion of said edge piece being translucent.

5. The trim element of claim 4, wherein the outer surface of the transparent element extends in the same plane as at least a portion of outer surface of the edge piece such that the outer surface of the trim element is continuous and uninterrupted at the transition between the main display surface and the peripheral display surface.

6. The trim element according to claim 1, wherein the screen is held by a support comprising at least a portion extending facing the peripheral display area, the luminous sheet extending on the reverse of said screen and said portion of the support so that light emitted by said luminous sheet passes through the screen and the portion of the support before reaching the outer surface of the trim element.

7. The trim element according to claim 1, wherein the illumination device comprises at least one light guide extending from the luminous sheet and directing the light emitted by said luminous sheet onto at least a portion of the peripheral display surface.

8. The trim element according to claim 1, wherein the luminous sheet comprises a plurality of light emitting diodes forming a light emitting diode matrix defining a plurality of diode sub-matrices, each sub-matrix being activatable independently of the other sub-matrices, at least one of said sub-matrices generating the first luminous signal and at least one of the other sub-matrices generating the second luminous signal.

9. The trim element according to claim 1, wherein the luminous sheet is flexible and deformable so that it can conform to the shape of the trim element.

10. The trim element according to claim 1, wherein the display device and the illumination device are driven by a same control unit, said control unit extending on the reverse of the luminous sheet.

\* \* \* \* \*